United States Patent
Anthony et al.

(10) Patent No.: US 7,636,089 B2
(45) Date of Patent: Dec. 22, 2009

(54) PHOTO MANTEL VIEW AND ANIMATION

(75) Inventors: Colin R. Anthony, Bothell, WA (US); Justin Mann, Kirkland, WA (US); Martijn E. Van Tilburg, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 347 days.

(21) Appl. No.: 11/223,751

(22) Filed: Sep. 9, 2005

(65) Prior Publication Data

US 2007/0057964 A1 Mar. 15, 2007

(51) Int. Cl.
*G06T 15/00* (2006.01)
(52) U.S. Cl. .................. 345/419; 345/619; 345/473
(58) Field of Classification Search ......... 345/418–419, 345/629, 473–475
See application file for complete search history.

(56) References Cited

U.S. PATENT DOCUMENTS

| | | | | |
|---|---|---|---|---|
| 4,737,921 | A | 4/1988 | Goldwasser et al. | 345/421 |
| 4,821,210 | A | 4/1989 | Rumbaugh | 345/421 |
| 5,608,850 | A * | 3/1997 | Robertson | 345/427 |
| 5,742,749 | A | 4/1998 | Foran et al. | 118/249 |
| 6,256,043 | B1 * | 7/2001 | Aho et al. | 345/629 |
| 6,292,198 | B1 * | 9/2001 | Matsuda et al. | 345/473 |
| 6,319,318 | B1 | 11/2001 | Pekarek et al. | 118/249 |
| 6,577,328 | B2 * | 6/2003 | Matsuda et al. | 715/757 |
| 6,621,509 | B1 | 9/2003 | Eiref et al. | 345/836 |
| 6,639,594 | B2 | 10/2003 | Zhang et al. | 345/426 |
| 6,639,601 | B1 | 10/2003 | Asai et al. | 345/474 |
| 6,741,244 | B1 | 5/2004 | Czuchry, Sr. et al. | 345/419 |
| 6,772,195 | B1 * | 8/2004 | Hatlelid et al. | 709/204 |
| 6,938,069 | B1 * | 8/2005 | Narayanaswamy | 709/204 |
| 6,972,757 | B2 * | 12/2005 | Arikawa et al. | 345/419 |
| 7,191,220 | B2 * | 3/2007 | Ohwa | 709/206 |
| 7,213,229 | B2 * | 5/2007 | Stevens et al. | 717/110 |
| 7,225,114 | B2 * | 5/2007 | Hayashi et al. | 703/6 |
| 7,343,268 | B2 * | 3/2008 | Kishikawa | 703/1 |
| 2002/0054164 | A1 | 5/2002 | Uemura | 715/848 |
| 2004/0102226 | A1 | 5/2004 | Miwa | 455/566 |
| 2004/0135786 | A1 | 7/2004 | Sasaki et al. | 345/506 |
| 2004/0150657 | A1 | 8/2004 | Wittenburg et al. | 345/619 |

(Continued)

FOREIGN PATENT DOCUMENTS

EP 0352741 1/1990

(Continued)

OTHER PUBLICATIONS

Apted et al., Tabletop Sharing of Digital Photographs for the Elderly, CHI 2006 Proceeding, Apr. 22-27, 2006, pp. 781-790.*

(Continued)

*Primary Examiner*—Phu K Nguyen
(74) *Attorney, Agent, or Firm*—Shook, Hardy & Bacon LLP

(57) ABSTRACT

A system and computer-implemented method for rendering images on a two-dimensional display, such as a computer, handheld device, or television screen, so that the images appear to be positioned in a three-dimensional space. The images may be graphics files or standard files with an associated thumbnail image. Numerous layouts of the images on the display are disclosed.

39 Claims, 6 Drawing Sheets

U.S. PATENT DOCUMENTS

2004/0254456 A1    12/2004    Ritter .................. 600/425

FOREIGN PATENT DOCUMENTS

GB            2256567        12/1992

OTHER PUBLICATIONS

Klein et al., Non-Photorealistic Virtual Environments, SIGGRAPH 2000, ACM proceeding, pp. 527-534.*

Rudy Mantel and Associates, Forensic Animation, http://www.rmantel.com/index.html, retrieved Aug. 9, 2005.

Home Design Architectural Series 4000 Product Details, http:/home-design-software-review.toptenreviews.com/home-design-architectural-series-4000-software.html, retrieved Aug. 9, 2005.

Getting into the Picture, http://plus.maths.org/issue23/features/criminisi/, retrieved Sep. 9, 2005.

2.3 Three Dimensional Computer Graphics, http://www.cs.newcastle.edu.au/~richard/research/thesis/graphics.html, retrieved Sep. 9, 2005.

Ahokas, Timo, Shadow Maps, Helsinki University of Technology, Telecommunications Software and Multimedia Laboratory, Tik-110.500 Seminar on Computer Graphics, 2002.

* cited by examiner

US 7,636,089 B2

PHOTO MANTEL VIEW AND ANIMATION

A portion of the disclosure of this patent document may contain material which is subject to copyright protection. The copyright owner has no objection to the facsimile reproduction by anyone of the patent document or the patent disclosure, as it collectively appears in the Patent and Trademark Office patent file or records, but otherwise reserves all copyright rights whatsoever.

BACKGROUND

Presenting a three-dimensional scene using a two-dimensional medium is well known in the art. One skilled in the art will know numerous techniques for presenting a three-dimensional scene using a two-dimensional medium, such as a computer screen or paper, e.g., linear perspective and projective geometry. The various techniques use matrices, e.g., homography matrices, and the relative positions of an image to transform images between the different perspective views. In addition, various techniques for generating shadows for the presentation of realistic three-dimensional graphics are also well known. Algorithms and methods for producing hard and soft shadows for rendering three-dimensional graphics are also well known.

A shortcoming exists in the art involving the presentation of a plurality of images for a user's review. Current methods of display include using thumbnails to display image files or data files with associated thumbnail images. Users may easily become bored of the generated display. For example, on a DVD, the chapter selection feature displays snapshots from a movie. The generated display is in a conventional grid-like format with no three-dimensional rendering.

There is a need in the art for a method and system for rendering a view of a plurality images on a two-dimensional display such that they appear to be in a three-dimensional space with three-dimensional graphical effects and animated transitions between views.

SUMMARY

The following represents a simplified summary of some embodiments of the invention in order to provide a basic understanding of various aspects of the invention. This summary is not an extensive overview of the invention. It is not intended to identify key or critical elements of the invention or to delineate the scope of the invention. Its sole purpose is to present some embodiments of the invention in simplified form as a prelude to the more detailed description that is presented below.

In accordance with aspects of the invention, a computer-implemented method of rendering at least one image to a user viewing a two-dimensional display such that the images appear to be positioned in a three-dimensional space is herein disclosed. The method includes steps of receiving an indication of a memory location, identifying and receiving images, determining a position on the display for the images, transforming the images, and rendering the images. A computer-readable medium comprising computer-readable instructions for performing the computer-implemented method described above is also envisioned.

In accordance with aspects of the invention, a computer system for rendering a plurality of images to a user viewing a two-dimensional visual display is also envisioned. The system may be comprised of a processing unit, visual display, memory unit, numerous module for performing various functions, and an input device.

BRIEF DESCRIPTION OF THE DRAWINGS

The present invention is illustrated by way of example and not limited in the accompanying figures in which like reference numerals indicate similar elements and in which.

In accordance with various aspects of the invention.

DETAILED DESCRIPTION

Figure 1:
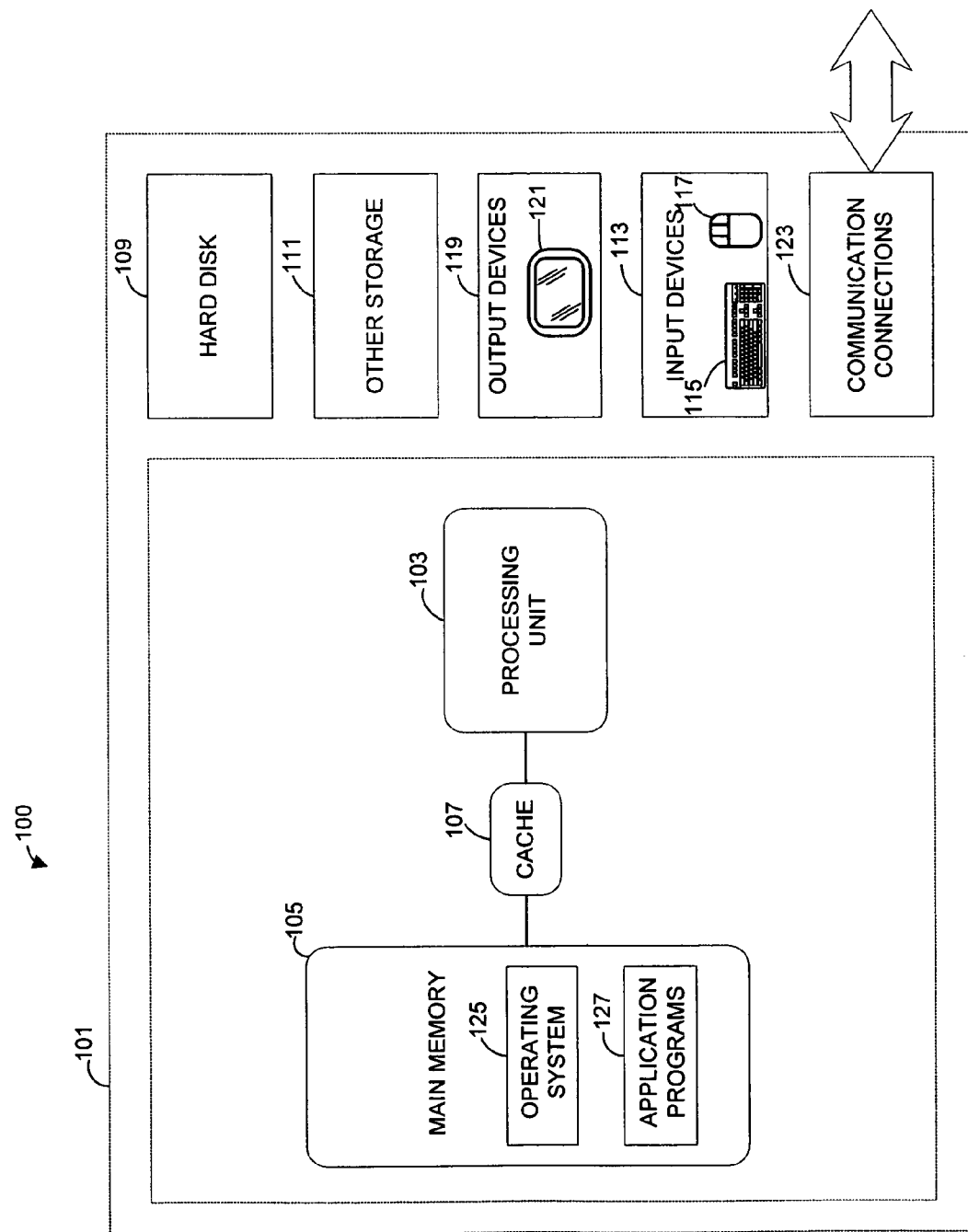
FIG. 1 is a depiction of an exemplary operating environment in accordance with various aspects of the invention.

An example of a suitable operating environment 100 in which various aspects of the invention may be implemented is shown in the highly simplified schematic diagram in FIG. 1. The features of such environments are well-known to those having skill in the art and need not be described at length here. The operating environment 100 is only one example of a suitable operating environment and is not intended to suggest any limitation as to the scope of use or functionality of the invention. Suitable computing environments for use with the invention include any computing device or computing system that supports interaction between user and machine.

With reference to FIG. 1, an illustrative system for implementing aspects of the invention includes a computing device, such as device 101. Device 101 commonly includes at least one processing unit 103 and memory unit (e.g., main memory 105, cache memory 107, etc.) connected to or situated within the processing unit 103 and serving as a buffer for the main memory 105. The memory unit may be comprised of one or more memories. Device 101 may have additional storage, including at least one magnetic hard disk 109 that serves as nonvolatile secondary storage and which is additionally used along with the main memory 105 in providing virtual memory. Device 101 may also have other storage 111, such as optical disks, removable magnetic disks, magnetic tape, and other removable and nonremovable computer-readable media capable of nonvolatile storage of program modules and data and accessible by device 101. Any such storage media may be part of device 101. To facilitate user-machine interaction, device 101 may have input devices 113 (e.g., keyboard 115, mouse 117, or other pointing devices), and output devices 119 (e.g., printer, plotter, portable handheld display screen, monitor, etc.). FIG. 1 illustrates a two-dimensional visual display screen 121 as an exemplary output device 119. Device 101 also typically includes one or more communication connections 123 that allow the device to communicate data with other devices.

Programs, comprising sets of instructions and associated data for the device 101, are commonly stored in the memory unit, from which they can be retrieved and executed by the processing unit 103. The processing unit 103 is capable of executing machine-readable instructions. Among the programs and program modules stored in the memory unit are those that comprise or are associated with an operating system 125 and with application programs 127. The device 101 has one or more systems of logical data storage, such as a file system or alternative systems using database-related techniques, associated with the operating system 125. Such systems of logical data storage serve as interfaces that map logically-organized data to data physically located on secondary storage media, such as data stored in clusters or sectors on the hard disk 109. In accordance with various embodiments of the invention, device 101 may be a handheld device or a conventional video player, e.g., a DVD player.

Computing device 101 includes forms of computer-readable media. Computer-readable media include any available media that can be accessed by the computing device 101. Computer-readable media may comprise storage media and communication media. Storage media include volatile and nonvolatile, removable and non-removable media implemented in any method or technology for storage of information such as computer-readable instructions, object code, data structures, program modules, or other data. Communication media include any information delivery media and typically embody data in a modulated data signal such as a carrier wave or other transport mechanism.

Figure 2:
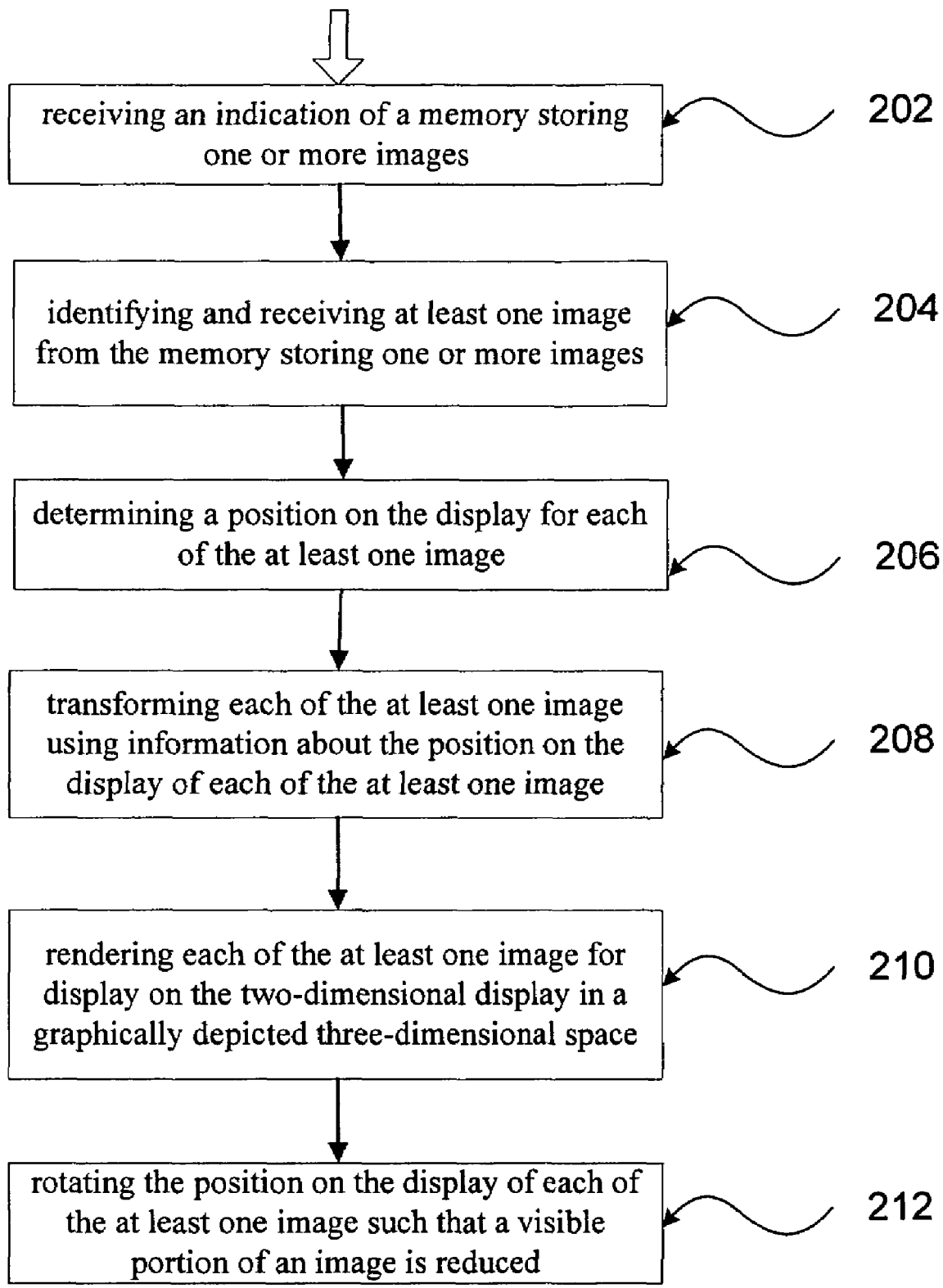
FIG. 2 is a flowchart diagramming a method of rendering images to a user in accordance with various aspects of the invention.

In accordance with various aspects of the invention, FIG. 2 illustrates a flowchart of a computer-implemented method for rendering at least one image to a user viewing a two-dimensional display 121. The images rendered appear to be positioned in a three-dimensional space when displayed on a two-dimensional display 121. Those skilled in the art will appreciate that the steps illustrated in FIG. 2 may be performed in other than the recited order, and that one or more steps illustrated in FIG. 2 may be optional. Further aspects of the invention are discussed in detail below.

In accordance with various aspects of the invention, step 202 includes receiving an indication of a memory storing one or more images. In one example, the indication is an identifier of a directory on a computer to which a user has navigated. In that particular case, step 202 may be performed in response to a user using a mouse 117 to click on a computer directory containing a plurality files. The one or more files may be graphic image files or standard files with an associated thumbnail image. For example, a Microsoft® Word document may have an image of the first page of that document saved as an associated thumbnail image. In another example, a standard image may appear for electronic files that do not have an appropriate associated thumbnail image. One example of a standard image may be a folder icon image. One of skill in the art will understand that an identifier of a directory includes, but is not limited to, an unique key to the directory folder or any pointer to a location in memory where the contents of a folder may be stored.

In accordance with various aspects of the invention, step 204 includes identifying and receiving at least one image from a memory storing one or more images. In some examples, the memory is comprised of at least a first image and a second image. The first and second image may be different (i.e., not identical.) A random selection module may be used to assist in the step of identifying an image from the memory. The random selection module results in a file from the directory of files being identified and received. As explained below, the received image is later displayed, for example, on a two-dimensional display 121.

Figure 5:
FIG. 5 is an illustration of a rendering of a first image and a second image for display on a two-dimensional display in accordance with various aspects of the invention.
Figure 6:
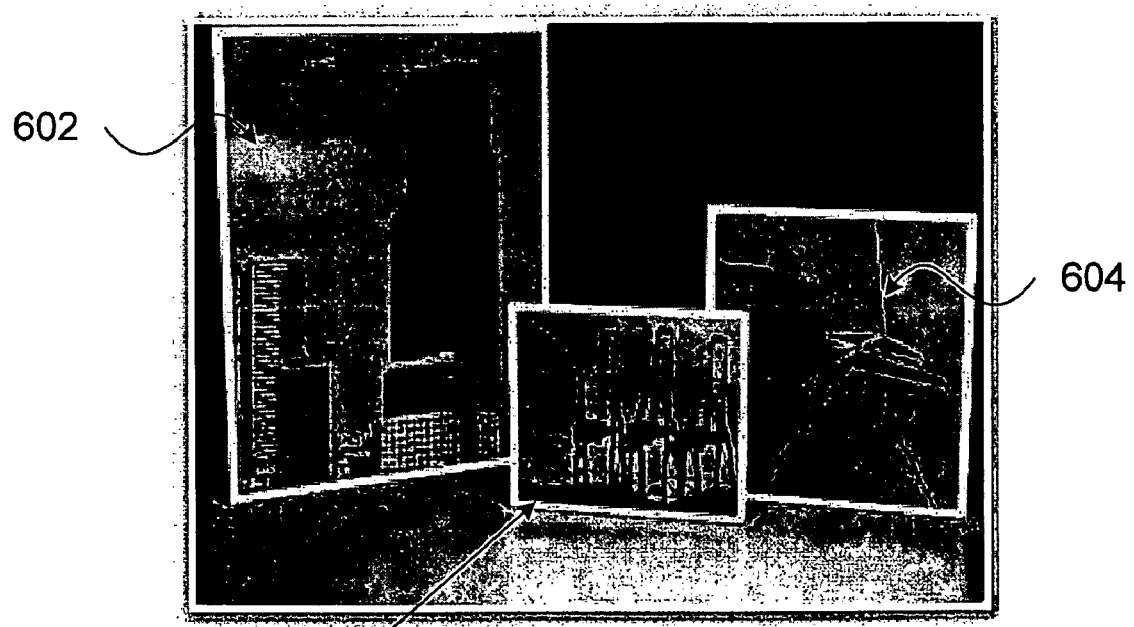
FIG. 6 is an illustration of a rendering of three randomly selected images for display in accordance with various aspects of the invention.

In addition, in step 206, a position on the display is determined for each of the images to be displayed. One skilled in the art will appreciate that there are numerous ways to layout a plurality of images on a display. For example, FIG. 5 is an illustrative view of two images on a two-dimensional display. Meanwhile, FIG. 6 is an illustrative view of three images on a two-dimensional display. Furthermore, illustrative views showing a single image, four images, and five or more images are also contemplated by the invention, although not illustrated. In addition, the position of an image on the display for each of the various layouts may be pre-determined. At least one advantage to this may be a savings in computation at the time of transforming and/or rendering.

In accordance with various aspects of the invention, step 208 includes transforming an image using information about the position of the image on the display. Transforming includes, but is not limited to, the operation of translating, skewing, scaling, and/or changing the orientation of an image. One skilled in the art will understand that various technique are conventionally used to transform images to make them appear three-dimensional.

In step 210, one or more images are rendered for display on the two-dimensional display in a graphically depicted three-dimensional space. For example, in FIGS. 5 and 6, images are displayed in such a manner. In FIG. 5, a first image 502 and a second image 504 are displayed such that they appear to be positioned in a three-dimensional space, e.g., on a mantel piece. In FIG. 6, a plurality of images (602, 604, 606) are displayed in accordance with various aspects of the invention. Like image 502 in FIG. 5, image 602 in FIG. 6 is more prominent that the other images rendered for display to the user. While there are advantages to more prominently displaying an image than others, the invention is not so limited. Rather, in some examples, all or some of the images may be equally prominent.

Finally in step 212, the position on the display of the images is rotated such that the visible portion of an image is reduced. The visible portion of an image is the part of the image that is visible to a user. In various examples in accordance with the invention, the step of rotating the position of the image is performed in response to user navigation. For example, a user pressing the right arrow key on a keyboard 115 may eventually result in the moving of the positions of the images on the display 119. In another example, a user may navigate a pointer of a mouse 117 in a given direction to eventually cause the positions of the images on the display to be rotated. In some examples, the rotating may be delayed by a pre-determined amount of time. At least one advantage of a delay feature is that it allows a user to enjoy the visible transition from one perspective view to another.

Figure 7:
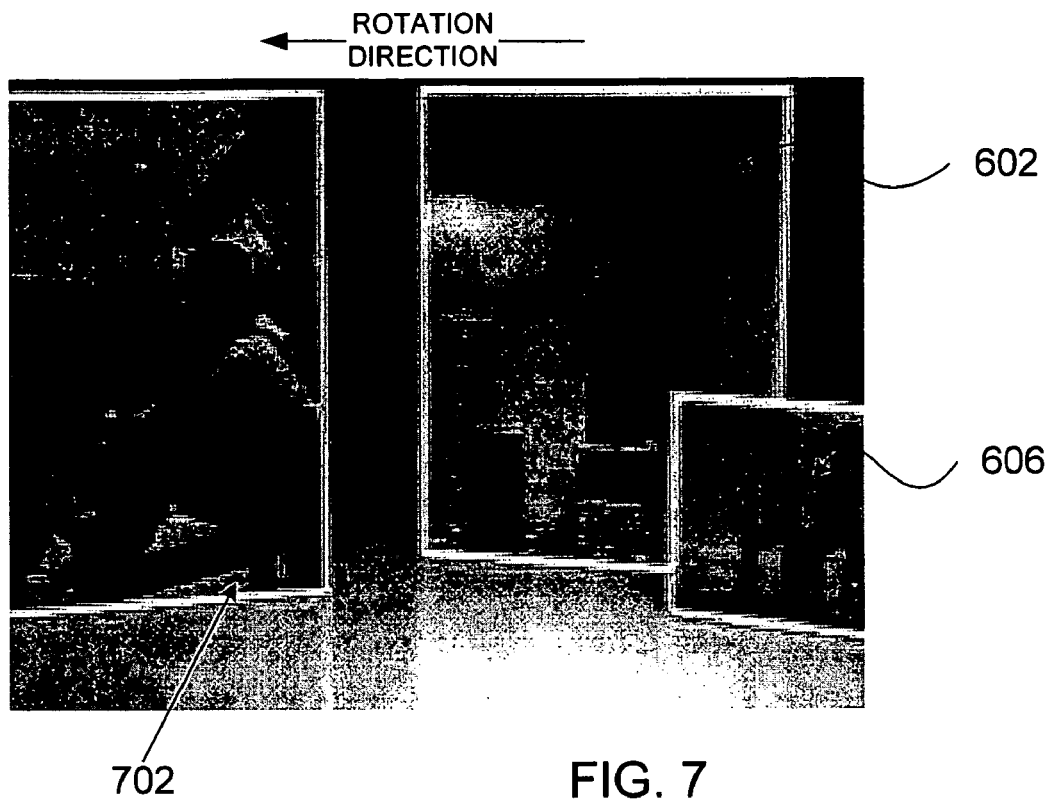
FIG. 7 is an illustration of a step of rotating the position of images on the two-dimensional display.

For example, referring to FIG. 7, image 702 is an image from a prior display in accordance with the invention. Meanwhile, image 602 and image 606 in FIG. 7 are images from a new display in accordance with the invention. FIG. 7 illustrates the position of images in rotation such that a visible portion of an image is reduced. In the example depicted in FIG. 7, the visible portion of image 702 is reduced. Meanwhile, the visible portion of image 602 and image 606 are increased. The final display after the rotation is complete is illustrated in FIG. 6, which shows images 602, 604, and 606 displayed on the screen.

In accordance with various aspects of the invention, step 212 may also include the step of transforming the images. In continuing the prior example relating to FIG. 7, the transition animation also includes transforming the displayed images such that they appear to be displayed in a three-dimensional space. In particular, an illustrative view of the images is such that the images appear to be placed along the perimeter of a substantially circular space while the user's view is from the perspective of a fixed position at or near the center of the space. In other words, the images appear to the user such that the user is viewing the images from a fixed position at the center of a three-dimensional substantially circular space. Thus, the images are transformed as they are rotated.

Figure 3:
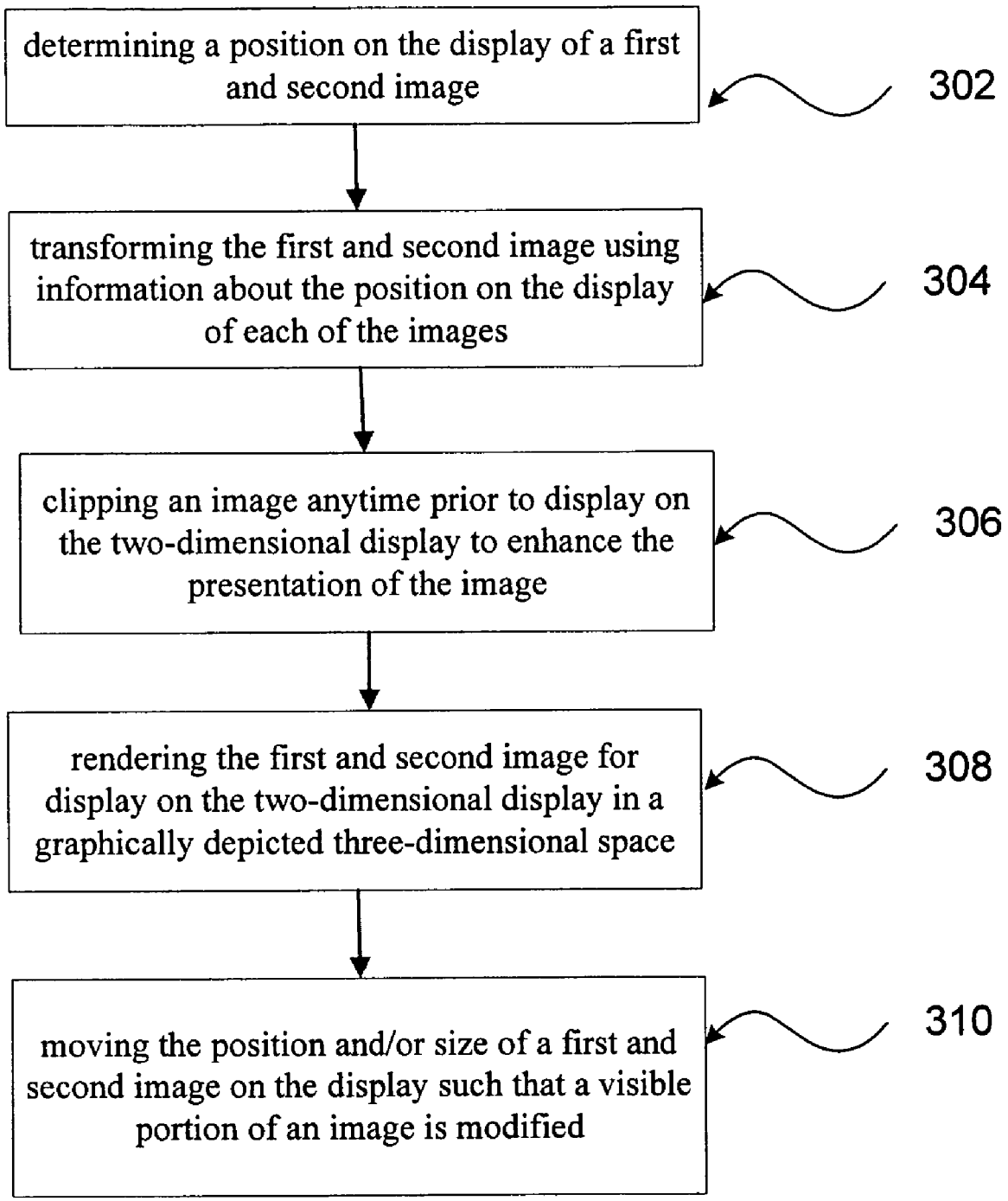
FIG. 3 is another flowchart diagramming a method of rendering images to a user in accordance with various aspects of the invention.

Referring now to the illustrative flowchart in FIG. 3, one skilled in the art will appreciate that the illustrated steps may be performed in other than the recited order, and that one or more illustrated steps may be optional. FIG. 3 illustrates a flowchart of a computer-implemented method for rendering a plurality of images to a user viewing a two-dimensional display 121. The images rendered appear to be positioned in a three-dimensional space when displayed on a two-dimensional display 121. Like step 206, in step 302, a first and second images' position on the display is determined. In step 304, like in step 208, information about a first and second images' position on the display is used to transform the images. Anytime prior to display, in step 306, the image is clipped to enhance the presentation of the image in accordance with various aspects of the invention. One skilled in the art will understand that the operation of clipping includes, but is not limited to, the cutting out of segments of an image. Clipping may be beneficial for a number of reasons: clipping reduces memory usage and may increase efficiency.

In accordance with various aspects of the invention, in step 308, a first image and a second image are rendered for display such that they appear to be positioned in a three-dimensional space. One skilled in the art will recognize that step 308 is similar to step 210 from FIG. 2. Moreover, in step 308, a three-dimensional graphical effect may be rendered for display. Examples of three-dimensional graphical effects include, but are not limited to, reflections, shadows, and decorative graphical effects. For example, in FIG. 5, a reflection of image 502 and image 504 is visible below the actual image in the figure. Also, a shadow of image 606 is visible on the left side of that image. In addition, a decorative graphical effect is visible around the perimeter of images 502 and 504. The white border (i.e., photo frame) around images 502 and 504 is an example of a decorative graphical effect. Rather, decorative graphical effects include, but are not limited to, the photo frame effect of the white border, background, and flooring. At least one benefit of step 308 is the enhanced presentation of the first and second images that results.

Finally, in step 310, the position and/or size of a first and second image on the display are moved such that a visible portion of an image is modified. For example, referring to FIG. 7, image 702 is an image from a prior display, while images 602 and 606 are from a new display in accordance with the invention. In the example depicted in FIG. 7, the visible portion of image 702 is reduced. Meanwhile, the visible portions of image 602 and image 606 are increased. The position of image 602 and image 606 on the screen is moved to the left. One skilled in the art will understand that the positions of images may be moved in other directions in accordance with the invention.

Figure 8:
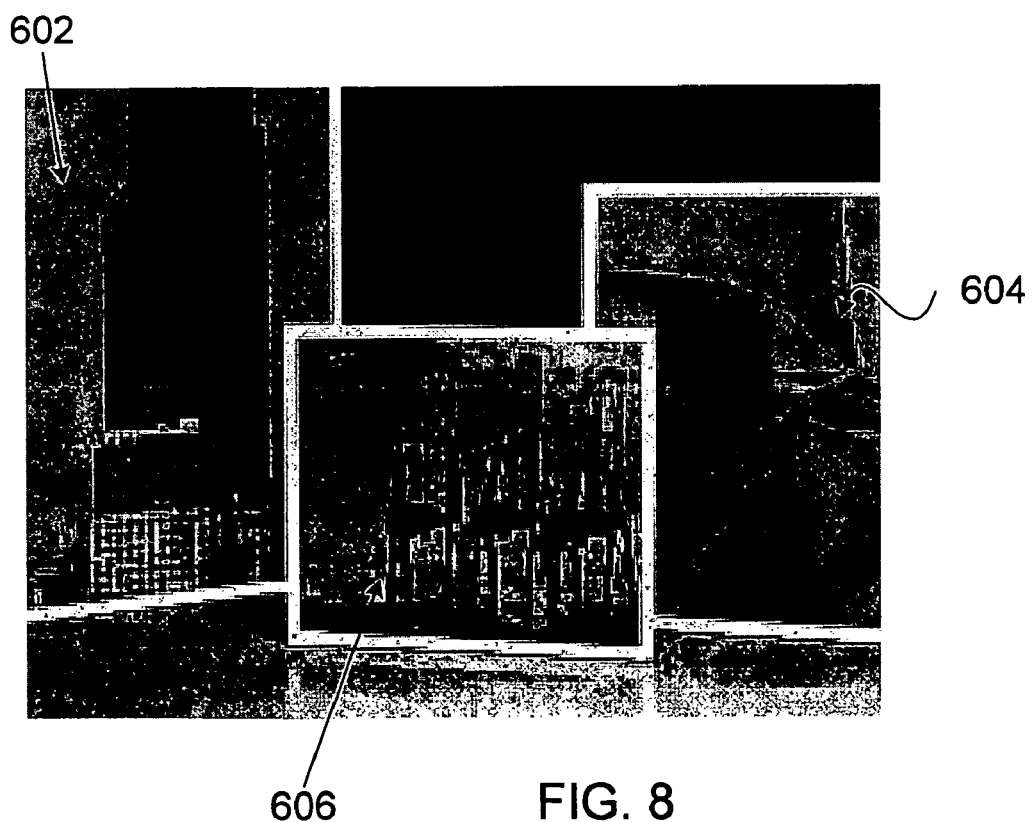
FIG. 8 is an illustration of a step of modifying the size of an image in accordance with various aspects of the invention.

Furthermore, the size of an image may be modified in step 310. In some examples, step 310 may be performed in response to user input. Assuming the images are selectable, one way a user may provide user input is by selecting an image using a mouse 117. Referring to FIG. 8, a user selecting image 606 results in the display being zoomed in to image 606. In FIG. 8, image 606 is larger than the same image depicted in FIG. 6. Also, the visible portions of images 602 and 604 in FIG. 8 are reduced.

Figure 4:
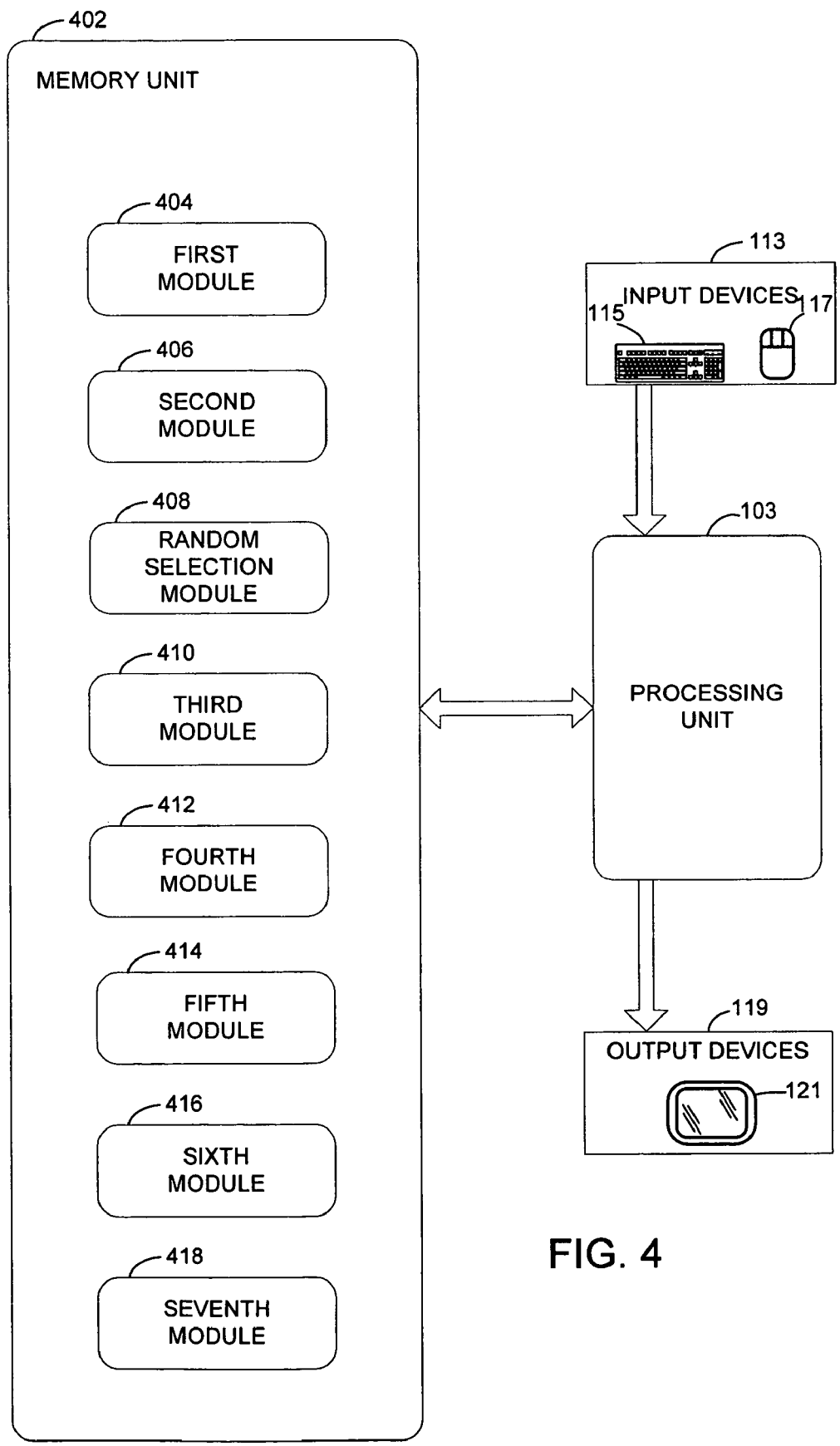
FIG. 4 is an exemplary diagram of a computer system for rendering images to a user in accordance with various aspects of the invention.

Referring to FIG. 4, a system for rendering at least one image to a user viewing a two-dimensional display 121 is illustrated. In accordance with various aspects of the invention, the images are rendered to appear to be positioned in a three-dimensional space when displayed. A system in accordance with the invention may be comprised of the following: a processing unit 103 capable of executing instructions readable by a machine; a two-dimensional visual display 121 for displaying a plurality of images; an input device 113 capable of allowing a user to select an image; a memory unit 402 comprising the images and the machine-readable commands for execution by the processing unit 103; and numerous modules (404 to 418) of machine-readable instruction for execution by the processing unit.

For example, a DVD player containing the aforementioned components of the system may behave in accordance with the invention. Various aspects of the invention were discussed in detail earlier. The first module 404 may be performed in response to a user selecting a menu option on a DVD. The first module 404 receives an indication of a plurality of images stored in the memory unit. The second module 406 identifies and receives a first image and a second image from the plurality of images stored in the memory unit 402. The second module 406 is assisted by the random selection module 408, as explained earlier. The third module 410 determines a first position on the visual display for the first image and a second position on the visual display for the second image. The fourth module 412 transforms the first image with information about the first position and the second image with information about the second position on the visual display. The fifth module 414 renders the first image and second image for display such that the first image and second image appear to be positioned in a three-dimensional space. The sixth module 416 renders three-dimensional graphical effects for display on the two-dimensional display to enhance the presentation of the first image and second image. The seventh module 418 moves the position of the first image on the display and the position of the second image on the display such that in response to user input a visible portion of the first image is reduced. One skilled in the art will understand that the function of one or more modules may be combined into a single component without necessarily teaching away from the invention contemplated by the disclosure.

After through review of the entire disclosure, it will become apparent to one skilled in the art that there are numerous practical applications for various aspects of the invention. For example, a computer-readable medium containing computer-executable instructions for performing the method diagrammed in the flowcharts of FIGS. 2 and 3 is contemplated by the aforementioned disclosure. The usefulness of the invention in such a context is apparent to one skilled in the art. Finally, aspects of the invention may be beneficial anywhere there is a need to display multiple images simultaneously for a user's review, e.g., in a thumbnail view. Finally, one skilled in the art will recognize that aspects of the invention may be advantageous in applications outside of computers, e.g., in a DVD player.

The use of the terms "a," "an" and "the" and similar referents in the context of describing the invention, especially in the context of the following claims, is to be construed to cover both the singular and the plural, unless otherwise indicated herein or clearly contradicted by context. The terms "comprising," "having," "including," and "containing" are to be construed as open-ended terms (meaning "including, but not limited to,") unless otherwise noted. The use of any and all examples or exemplary language herein (e.g., "such as") is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations on those preferred embodiments may become apparent to those having ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The present invention has sometimes been described in terms of preferred and illustrative embodiments thereof. Numerous other embodiments, modifications and variations within the scope and spirit of the appended claims will occur to persons of ordinary skill in the art from a review of this disclosure.

We claim:

1. A method of displaying graphical images implemented by a computing system on a display screen, comprising:
    a) providing at least one graphical image having a geometrically regular outline;
    b) transforming the graphical image to alter its perspective; and
    c) locating the transformed graphical image at a desired location on the display screen,
    wherein the transforming and locating steps produce an appearance of three-dimensional orientation of the graphical image on the display screen, and when more than one graphical image is transformed a position of each graphical image is pre-determined for each transformation before rendering a collection of the graphical images on a display screen.

2. The method of claim 1 wherein transforming the image by altering its perspective includes altering the outline of the image.

3. The method of claim 1 wherein transforming the image by altering its perspective includes changing the linear perspective of the image.

4. The method of claim 1 wherein transforming the image by altering its perspective includes changing the projective geometry of the image.

5. The method of claim 1 wherein the step of locating the transformed image at a desired location in the display screen includes the step of user selection of the desired location.

6. The method of claim 1 wherein the step of transforming the image by altering its perspective includes rotating the image.

7. The method of claim 1 wherein the step of transforming the image by altering its perspective includes skewing the image.

8. The method of claim 1 further comprises step d) displaying a reflection of the graphical image located on the display.

9. The method of claim 1 further comprises step d) displaying a shadow from the graphical image located on the display.

10. The method of claim 1 further comprises step d) displaying a photo boarder effect around the graphical image located on the display.

11. The method of claim 1 further comprising the step of clipping the image prior to locating the image on the display to redefine the image outline.

12. The method of claim 1 wherein the step of providing includes receiving the image from a random selection computer module.

13. The method of claim 1 wherein the step of providing includes receiving the image from a predefined list of images.

14. A computer storage medium having instructions for causing a computer to execute the method of claim 1.

15. A method of displaying images implemented by a computing system on a display screen, comprising:
    a) providing at least one graphical image having a geometrically regular outline;
    b) providing at least one frame on a display screen;
        wherein the frame is a geometrically regular space defined by a boundary to contain and define the display of the at least one graphical image;
    c) transforming the description of the frame to alter the boundary of the frame and its apparent perspective;
    d) locating the at least one graphical image associated with the frame on the display screen; and
    e) transforming the at least one graphical image to match the transformed description of the frame and alter the apparent perspective of the at least one graphical image;
    wherein the transforming, translating, and locating steps produce an appearance of three-dimensional orientation of the at least one graphical image within the frame on the display screen.

16. The method of claim 15 wherein the step of transforming alters the boundary of the frame by changing the linear perspective and projective geometry of the frame.

17. The method of claim 15 wherein the geometrically regular outline of the image is generally rectangular.

18. The method of claim 15 wherein the geometrically regular space defined by the boundary of the frame is generally circular, and wherein the transforming step alters the boundary to a generally oval shape.

19. The method of claim 15 wherein the step of locating the image to frame on the display screen includes a user selection of the frame.

20. The method of claim 15 wherein the step of providing includes receiving the image data from a random selection computer module.

21. A computer storage medium having instructions for causing a computer to execute the method of claim 15.

22. A method implemented by a computing system, comprising:
    a) providing data of at least one graphical image having a geometrically regular outline;
    b) providing data defining a background capable of being rendered on a display;
    c) transforming the at least one graphical image data to produce an appearance of a three-dimensional orientation of the at least one graphical image;
    c) combining the transformed data of the at least one graphical image with the data defining a background such that the combined data conveys an appearance of three-dimensional orientation of the at least one graphical image against the background on a display screen.

23. The method of claim 22 wherein transforming the image data comprises altering the outline definition of the image.

24. The method of claim 22 wherein transforming the image data comprises changing the linear perspective of the image.

25. The method of claim 22 wherein transforming the image data comprises changing the projective geometry of the image.

26. The method of claim 22 wherein the data defining the background displays a three-dimensional image of a horizontal surface; and wherein combining the data defining the background with the transformed data of an image, the combined data displays an appearance of a three-dimensional orientation of the image set upon the surface.

27. The method of claim 22 wherein the step of transforming the image data also includes rotating the image.

28. The method of claim 22 wherein the step of transforming the image data also includes skewing the image.

29. The method of claim 22 wherein the data defining the background includes data comprising a reflection of the transformed image data.

30. The method of claim 22 wherein the data defining the background includes data comprising a shadow from the transformed image data.

31. The method of claim 22 wherein the data defining the background includes data comprising a photo border effect around the transformed image data.

32. The method of claim 22 further comprising the step of clipping the image data prior to transforming the image data.

33. The method of claim 22 further comprising:
describing at least one frame within the data defining the background;
wherein the frame is a geometrically regular space defined by a boundary to contain image data;
transforming the description of the frame to alter the boundary of the frame to thereby provide perspective to the frame when rendered;
locating the image data to the frame when combining the image data with the data defining the background; and
translating the image data to match the transformed description of the frame.

34. The method of claim 33 wherein the step of transforming the description of the frame comprises altering the linear perspective and projective geometry of the frame.

35. A computer storage medium having instructions for causing a computer to execute the method of claim 22.

36. A computer system for rendering graphical images on a display screen, comprising:
a) a processor unit for receiving and executing computer instructions;
b) a display for displaying at least one graphical image;
c) instructions that, when executed by the processor unit, perform steps of
1) providing at least one graphical image having a geometrically regular outline;
2) transforming the at least one graphical image by altering its perspective;
3) locating the transformed at least one graphical image at a desired location on the display screen;
wherein the transforming and locating steps produce an appearance of three-dimensional orientation of the at least one graphical image on the display screen.

37. A computer system for rendering images on a display screen, comprising:
a) a processor unit for receiving and executing computer instructions;
b) graphical image data defining at least one graphical image having a generally regular boundary;
c) a display for rendering the at least one graphical image;
d) computer instructions that, when executed by the processor unit, perform steps of
1) providing at least one image having a geometrically regular outline;
2) providing at least one frame on a display screen;
wherein the frame is a geometrically regular space defined by a boundary to contain and define the display of an image;
3) transforming the description of the frame;
wherein the transforming alters the boundary of the frame to alter the perspective of the frame;
4) locating the image to a frame on the display screen;
5) translating the image to match the transformed description of the frame;
wherein the transforming, translating, and locating steps produce an appearance of three-dimensional orientation of the image within the frame on the display screen.

38. A computer system for rendering images on a display screen, the images each including a regular image boundary defining the limit of the image data within said image, comprising:
a) a processor unit for receiving and executing computer instructions;
b) computer data describing at least one graphic image defined by a generally regular image boundary;
c) a display for displaying rendered images;
d) computer instructions that, when executed by the processor unit, perform steps of
1) providing data of at least one image having a geometrically regular outline;
2) providing data defining a background capable of being rendered on a display;
3) transforming the image data;
4) combining the transformed data of the image with the data defining a background such that the combined data is capable of being rendered to produce an appearance of a three-dimensional orientation of the image against the background on a display screen.

39. A computer-implemented method of a computing device rendering at least one graphical image to a user viewing a two-dimensional display, wherein each of the at least one graphical image appears to be positioned in a three-dimensional space when displayed on the two-dimensional display, comprising steps of:
receiving an indication of a memory storing one or more graphical images;
identifying and receiving at least one graphical image from the memory by the computing device for storing one or more graphical images;
determining a position on the display of each of the at least one graphical image by the computing device for;
transforming each of the at least one graphical image by the computing device for using information about the position on the display of each of the at least one graphical image;
rendering each of the at least one graphical image by the computing device for display on the two-dimensional display in a graphically depicted three-dimensional space;
wherein the transforming and locating steps performed by the computing device to produce an appearance of three-dimensional orientation of the image when rendered on the two-dimensional display in the graphically depicted thee-dimensional space.

* * * * *

UNITED STATES PATENT AND TRADEMARK OFFICE
CERTIFICATE OF CORRECTION

PATENT NO. : 7,636,089 B2  
APPLICATION NO. : 11/223751  
DATED : December 22, 2009  
INVENTOR(S) : Anthony et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 411 days.

Signed and Sealed this

Ninth Day of November, 2010

David J. Kappos
*Director of the United States Patent and Trademark Office*